United States Patent [19]

Okada et al.

[11] Patent Number: 5,016,120

[45] Date of Patent: * May 14, 1991

[54] APPARATUS FOR RECORDING AND REPRODUCING A DIGITIZED AUDIO SIGNAL ON A MAGNETIC TAPE WHICH HAS A SLANT TRACK FORMAT INCLUDING MEANS FOR DETECTING A CONTROL SIGNAL TO IDENTIFY A DIGITIZED AUDIO SIGNAL ON THE SLANT TRACK

[75] Inventors: Hiroshi Okada; Takao Takahashi, both of Tokyo, Japan

[73] Assignee: Sony Corporation, Tokyo, Japan

[*] Notice: The portion of the term of this patent subsequent to Sep. 20, 2005 has been disclaimed.

[21] Appl. No.: 388,314

[22] Filed: Aug. 1, 1989

Related U.S. Application Data

[63] Continuation of Ser. No. 168,580, Mar. 7, 1988, abandoned, which is a continuation of Ser. No. 838,626, Mar. 11, 1986, abandoned.

[30] Foreign Application Priority Data

Mar. 28, 1985 [JP]  Japan .................. 60-064554

[51] Int. Cl.⁵ ............................. G11B 5/02
[52] U.S. Cl. ..................... 360/27; 360/19.1; 369/47
[58] Field of Search ............ 360/19.1, 27, 32, 33.1, 360/14.1, 40, 48, 49; 358/343, 341; 369/32, 47, 48, 50

[56] References Cited

U.S. PATENT DOCUMENTS

| | | | |
|---|---|---|---|
| 4,303,950 | 12/1981 | Taniguchi et al. | 360/19.1 X |
| 4,347,527 | 8/1982 | Lainey | 360/33.1 X |
| 4,353,098 | 10/1982 | Heinz et al. | 360/9.1 |
| 4,353,098 | 10/1982 | Heinz et al. | 360/9.1 |
| 4,468,710 | 8/1984 | Hashimoto et al. | 358/343 X |
| 4,476,499 | 1/1984 | Kamamaru et al. | 360/32 X |
| 4,477,844 | 10/1984 | Nakano et al. | 360/32 X |
| 4,542,419 | 9/1985 | Morio et al. | 360/32 X |
| 4,551,771 | 11/1985 | Machida et al. | 360/19.1 |
| 4,558,378 | 12/1985 | Shibata et al. | 360/19.1 |
| 4,583,132 | 4/1986 | Nakano et al. | 360/19.1 |
| 4,622,600 | 11/1986 | Okamoto et al. | 360/32 |
| 4,647,985 | 3/1987 | Yokosawa | 360/19 X |
| 4,665,443 | 5/1987 | Tanaka | 360/7 |
| 4,772,960 | 9/1988 | Takahashi et al. | 360/19.1 X |

FOREIGN PATENT DOCUMENTS

| | | |
|---|---|---|
| 0085578 | 10/1983 | European Pat. Off. . |
| 0102600 | 3/1984 | European Pat. Off. . |
| 0149245 | 7/1985 | European Pat. Off. . |
| 0153410 | 9/1985 | European Pat. Off. . |
| 0173538 | 3/1986 | European Pat. Off. . |
| 57-109126 | 7/1982 | Japan .................. 360/27 |
| 58-98860 | 6/1983 | Japan .................. 360/27 |
| 58-80144 | 8/1983 | Japan . |
| 58-208915 | 3/1984 | Japan . |
| 2033700 | 5/1980 | United Kingdom . |
| 2059135 | 4/1987 | United Kingdom .......... 360/19.1 |

OTHER PUBLICATIONS

English translation of JP 58-80144 & 58-208915.

*Primary Examiner*—Aristotelis M. Psitos
*Assistant Examiner*—W. R. Young
*Attorney, Agent, or Firm*—Hill, Van Santen, Steadman & Simpson

[57] ABSTRACT

An apparatus for recording a plurality of audio signals on a slant track of a helically scanned tape. The tape is divided into a plurality of segments. A digitized audio signal may be recorded at each of the segments. A control signal is supplied and recorded at a beginning of each segment. The control signal can be used for controlling an operation of the apparatus when the control signal is reproduced.

5 Claims, 5 Drawing Sheets

APPARATUS FOR RECORDING AND REPRODUCING A DIGITIZED AUDIO SIGNAL ON A MAGNETIC TAPE WHICH HAS A SLANT TRACK FORMAT INCLUDING MEANS FOR DETECTING A CONTROL SIGNAL TO IDENTIFY A DIGITIZED AUDIO SIGNAL ON THE SLANT TRACK

This is a continuation of application Ser. No. 07/168,580, filed Mar. 7, 1988, now abandoned, which is a continuation of application Ser. No. 06/838,626, filed Mar. 11, 1986 now abandoned.

BACKGROUND OF THE INVENTION

1. Field of the Invention:

The present invention relates to an apparatus for recording and/or reproducing a PCM audio signal by using a rotary head.

2. Description of the Prior Art:

A standardization for the so-called 8 mm video tape recorder has been set internationally. With such standardization, recording and/or reproducing are carried out by a pair of rotary heads provided with an angular spacing of 180° therebetween, and a tape is wrapped around 221° of the rotational circumferential surface of the rotary heads. In a 180° interval of the 221°, a video signal is recorded and/or reproduced, while a PCM audio signal with a compressed time base is recorded and/or reproduced in the interval of the remaining 36°.

FIG. 1 shows a format of a recording track on a tape according to the above mentioned standardization. From the right-hand side at which the head begins to contact with the tape, at the tip end of the track there is provided a tracing start area 51 of 5° of a rotation angle of the head. At the next or rear portion of the tracing start area 51, over 2.06° (corresponding to 3 horizontal intervals (H) of a video signal), there is provided a clock run-in area 52 which is synchronized with succeeding PCM data. Next to the clock run-in area 52, there is provided a PCM data area 53 over 26.32° for use with an audio signal with a compressed time base. A period or area of 2.06° (3H) next to the data area 53 is assigned as a back margin area 54 for coping with the erroneous displacement of the recording position. The back margin area is followed by a guard area 55 of 2.62° between a video area and a PCM data area. Next to the guard area 55, there is provided a video signal area 56 for one field over 180°. Furthermore, the video signal area is followed by a head detaching area of 5°.

Accordingly, in this standardization, the video signal of one field is recorded on and reproduced from the video signal area 56. At the same time, an audio signal of 1/60 second is pulse code modulated, processed for error correction or the like, then time base compressed to about 1/6.8, and is recorded on and reproduced from the PCM data area 53. This recording track is sequentially and obliquely formed along the longitudinal direction of the tape, by which the continuous video and audio signals are recorded and/or reproduced.

SUMMARY OF THE INVENTION

In an apparatus of the invention for recording and/or reproducing a PCM audio signal by using a rotary head, an index signal is recorded on a part of a recording interval of the PCM audio signal by using the rotary head. It is thus possible to easily find a beginning of a recorded portion upon playback.

A recording and/or reproducing apparatus according to the invention is arranged such that a tracing period of a rotary head for recording and/or reproducing is divided into a plurality of segments. A PCM audio signal is recorded and/or reproduced in desired divided segments. An index signal is recorded at a predetermined portion of a recording and/or reproducing interval of the PCM audio signal by using the rotary head as required. Upon playback, the index signal recorded at the predetermined portion is detected to thereby control the operation of the apparatus.

DESCRIPTION OF THE PREFERRED EMBODIMENTS

Figure 1:
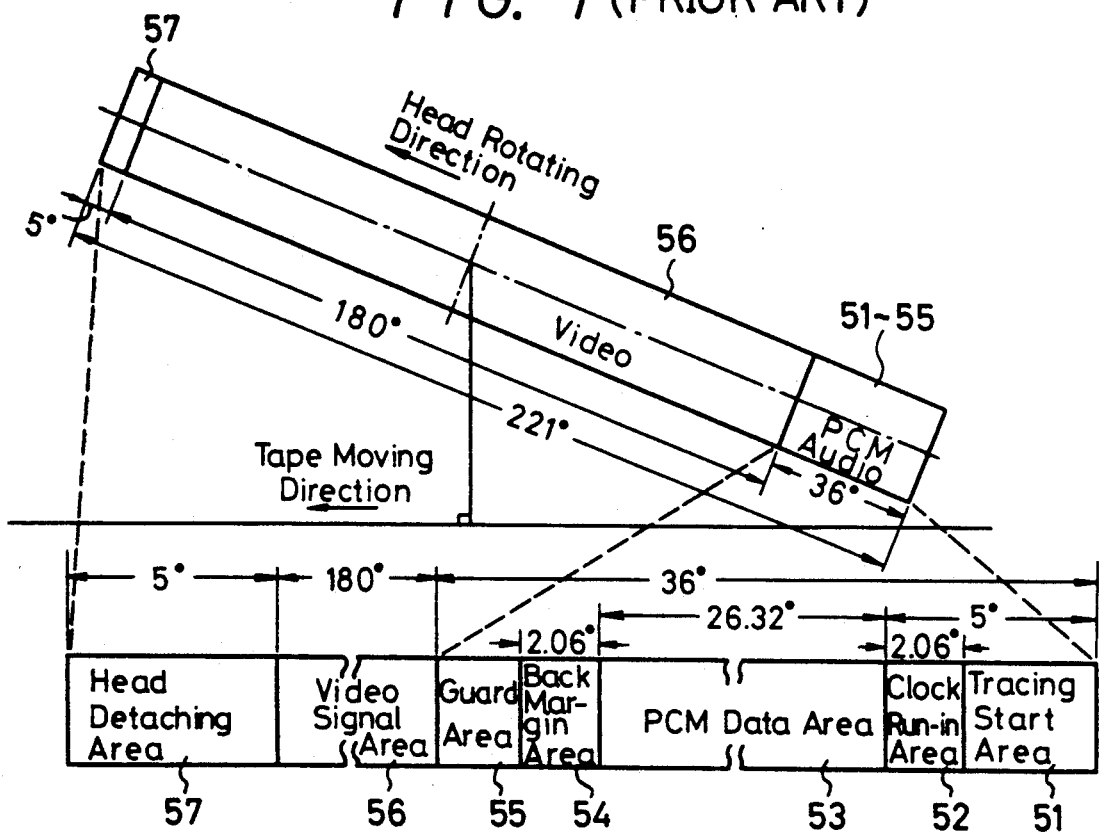
FIG. 1 is, useful for explaining a prior art track format.

It is interesting to note in the above-mentioned standardization, that when the video signal area 56 of 180° is equally divided by 5, each segment has 36°. When, on the other hand, the angle of the PCM data area 53, 5° of the tracing start area 51, 2.06° of the succeeding back margin area 54, and 2.62° of the guard area 55 are added, the total angle becomes just 36°. Therefore, it is proposed that an audio signal recording and/or reproducing apparatus is formed by using the apparatus conforming to the above-mentioned standardization.

Figure 6:
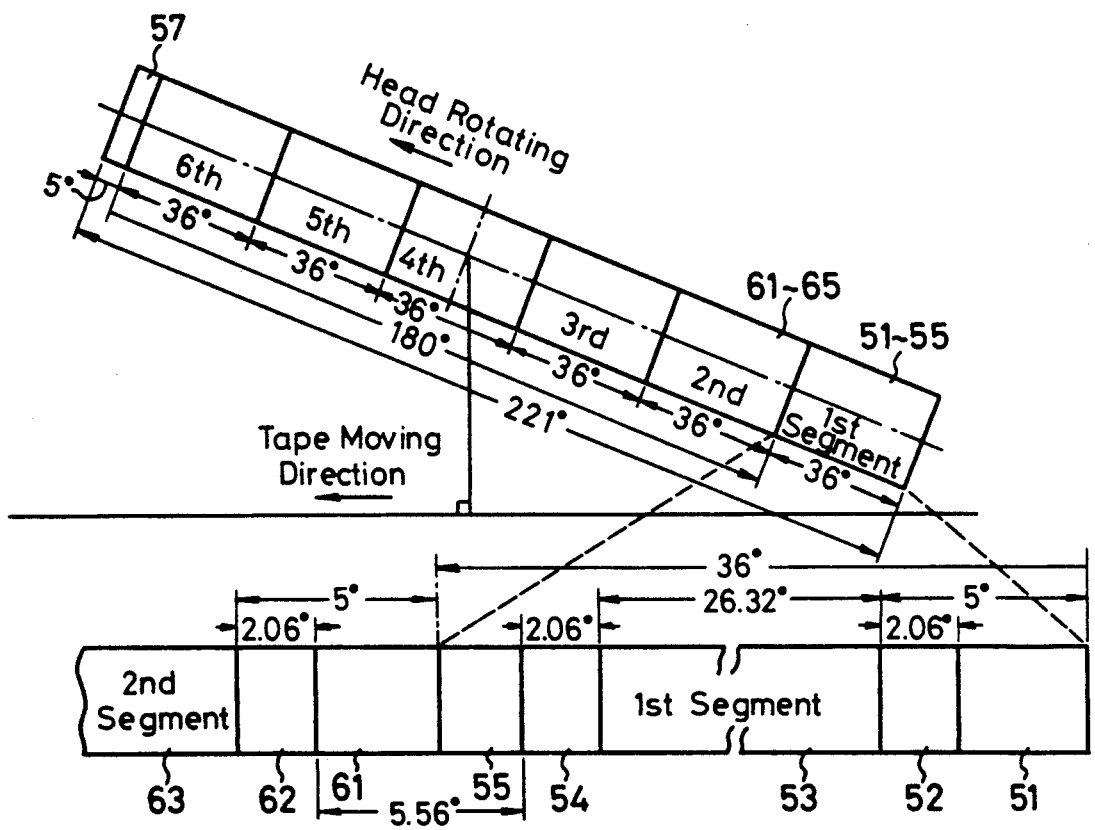
FIG. 6 shows a track format to which the invention is applied.

FIG. 6 shows an example of a format of a recording track used therefor. In the figure, the portion from the tracing start area 51 in which the head begins to contact with the tape to the guard area 55 is the same as that of the above-mentioned standardization and this interval is assigned as a first segment. Subsequently, from the beginning of the above-mentioned video signal area 56, there are provided a next tracing start area 61, a clock run-in area 62, a data area 63, a back margin area 64, and a guard area 65, each of which is formed the same as described above. This interval is assigned as a second segment. Furthermore, a portion the same as the second segment is repeatedly formed at every 36° of the video signal area 56 and assigned as the 3rd to 6th segments, respectively. After the last segment, there is provided a head detaching area 57 of 5°.

Accordingly, there are provided 6 segments from the 1st to the 6th. Then, for each segment, the rotation angle position of the rotary head is detected and the PCM data is delivered and recorded at a time corresponding to each 36° from the tape contact start side of the head and corresponding to a desired segment (interval). Also, by gating the desired time on period of the reproduced signal, it is possible to independently record and/or reproduce the respective segments. When the re-recording is carried out on the tape which is used once, by using a so-called flying erase head only during the period in which this head is in contact with the tape in an interval of a desired segment, it is possible to carry out the re-recording while erasing the corresponding interval selectively.

As described above, the PCM audio signal can independently be recorded and/or reproduced at the intervals that are provided by dividing the tape by 6 along the tape width direction. For example, by using a tape which is capable of 2-hour recording, it is possible to record the PCM audio signal for 12 hours, which is 6 times as long as the normal video recording.

In the prior art ½-inch tape video tape recorder, when it is desired to detect a beginning of a desired recorded portion, or a so-called program (beginning) search system is employed, and an index signal is formed by modifying a tracking control (CTL) signal recorded by a fixed head along the tape length. However, in the above standardization of the 8 mm video tape recorder, the tracking is carried out by using a pilot signal of a so-called four frequency system which is recorded by the rotary heads so that the recording of the CTL signal becomes unnecessary, unlike the prior art. In the 8 mm VTR, it is possible to record such an index signal on a special track provided outside the start area 51 on the detaching area 57 by a special fixed head. However, from a designing and manufacturing cost standpoint, it is not preferable to employ the special fixed head only for such purpose.

Furthermore, when the signals are divided into a plurality of (multiple) segments and then recorded, in order to record 6 index signals corresponding to the respective segments on one track, it becomes necessary to provide a complicated processing apparatus for coding the index signals and so on. Further, according to this method, it is very difficult to record, reproduce, and erase the index signal independently at every segment.

The prior art apparatus is constructed as described above so that the index signal for use in finding the beginning of the tape, etc. is recorded only by a special head and the like. Particularly, when the tape is divided into multiple segments, the prior art apparatus requires a code processing circuit which is complicated in circuit arrangement and the index signal can not be recorded, reproduced, and erased independently at every segment.

This invention provides a recording and/or reproducing apparatus in which scanning periods of rotary heads 13 and 14 capable of recording and/or reproducing are divided into a plurality of intervals, a PCM audio signal (output from a processor circuit 8) is recorded and/or reproduced in a desired divided interval, and an index signal (output from a MODEM circuit 10) is recorded on a predetermined portion of the recording and/or reproducing interval of the PCM audio signal as required. Thus, upon playback, the index signal recorded on the predetermined portion is detected to thereby control the operation.

According to this apparatus, since the index signal is recorded and/or reproduced by the rotary head, it becomes unnecessary to provide a special fixed head and so on. Particularly, when the tape is divided into multiple segments, the index signal is provided at every segment so that these index signals can independently be recorded, reproduced, and erased by a simple circuit arrangement, to thus find the beginning of a recording portion or a desired recorded portion, etc., satisfactorily.

Figure 2:
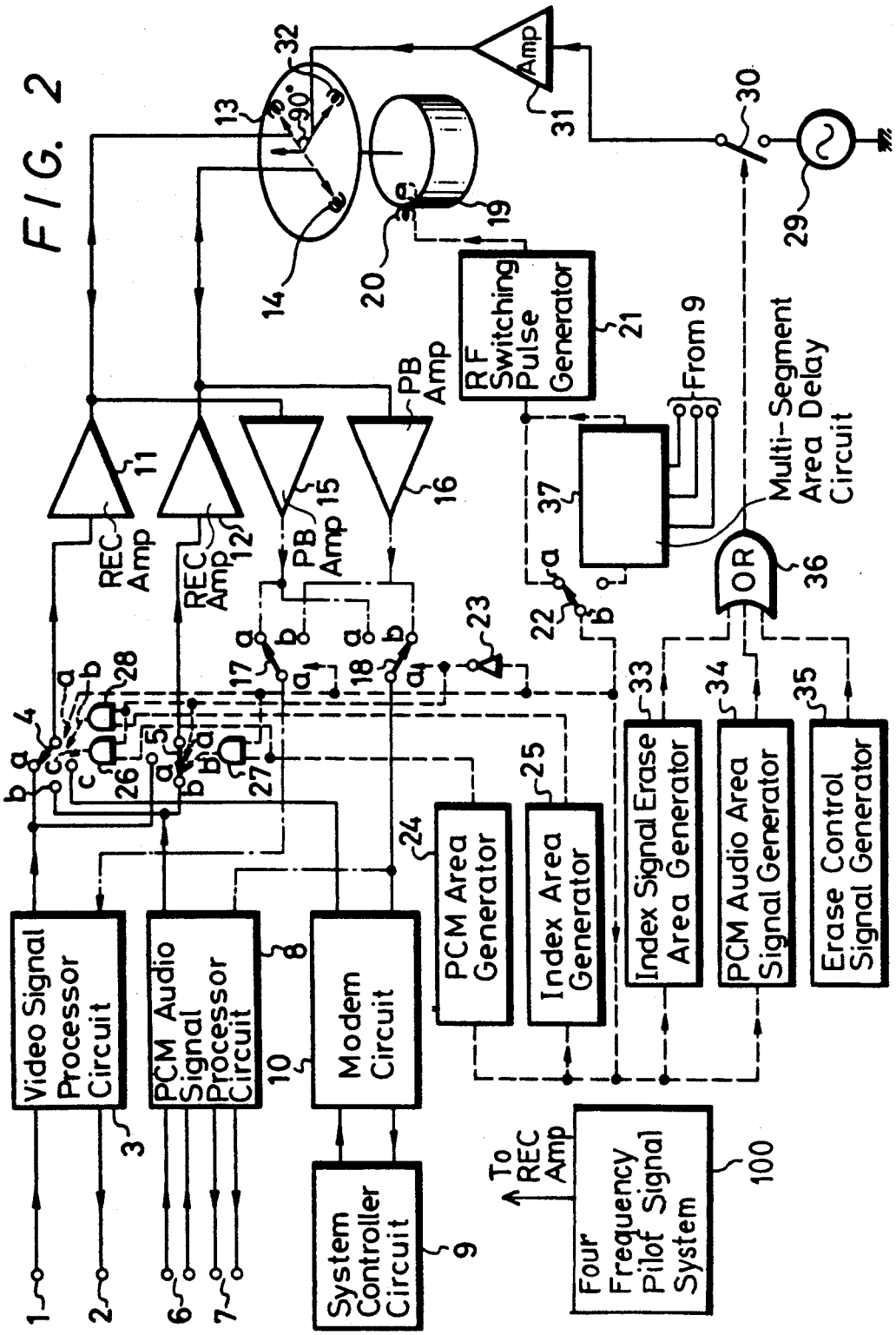
FIG. 2 is a block diagram of an embodiment of the present invention.

Referring now to FIG. 2, reference numeral 3 represents the video signal processor circuit, 4 and 5 the change-over switches, 8 the PCM-audio signal processor circuit, 10 the MODEM circuit for index signals, 13 and 14 the rotary heads, 21 the RF switching pulse generator circuit, 24 the PCM-audio area generator, and 25 the index area generator.

In FIG. 2, the video signal input terminal 1 and a video signal output terminal 2 are connected to the video signal processor circuit 3, and an output of a recording signal from the video processor circuit 3 is supplied to respective fixed terminals a of the change-over switches 4 and 5. Input terminals 6 and output terminals 7 for two channel audio signals are connected to the PCM audio signal processor circuit 8, and an output of a recording signal from the processor circuit 8 is supplied to respective fixed terminals b of the switches 4 and 5. A system controlled circuit 9 is connected to the MODEM circuit 10 for an index signal, and an output of a recording signal from the MODEM circuit 10 is supplied to a fixed terminal c of the switch 4. The movable contacts of the switches 4 and 5 are connected through recording amplifiers 11 and 12 to rotary heads 13 and 14 which are provided with an angular spacing of 180° therebetween.

The rotary heads 13 and 14 are connected through playback amplifiers 15 and 16 to fixed terminals a and b of change-over switches 17 and 18, respectively. The movable contact of the switch 17 is connected to a reproduced signal input terminal of the video processor circuit 3. The movable contact of the switch 18 is commonly connected to reproduced signal input terminals of the PCM audio signal processor circuit 8 and the index signal MODEM circuit 10.

A drum motor 19 for driving the rotary heads 13 and 14 is provided with a pulse generator 20 which detects the rotary phase. This generator 20 is connected to the RF switching pulse generator circuit 21 which produces RF switching pulses corresponding to the video signal periods of the rotary heads 13 and 14. The output from the generator circuit 21 is supplied through a normal side fixed terminal n of a normal and multi-segment change-over switch 22 to control terminals a of the switches 4 and 17. The output from the generator circuit is further supplied through the switch 22 and an inverter 23 to control terminals a of the switches 5 and 17.

The output signal from the switch 22 is supplied to the PCM audio area generator 24 and the index area generator 25. The output signal from the generator 24 and the output signal from the inverter 23 are supplied through an AND circuit 26 to the control terminal c of the switch 4. The output signal from the generator 24 and the output signal from the switch 22 are supplied through an AND circuit 27 to the control terminal b of the switch 5. The output signal from the generator 25 and the output signal from the inverter 23 are supplied through an AND circuit 28 to the control terminal b of the switch 4.

An output signal from an erase signal generator 29 is supplied through a switch 30 and an amplifier 31 to a flying erase head 32. The output signal from the switch 22 is supplied to an index signal erase area generator 33 and a PCM — audio erase area signal generator 34. The output signals from these generators 33 and 34, and an output signal from an erase control signal generator 35, are supplied through an OR circuit 36 to the control portion of the switch 30.

The output signal from the generator circuit 21 is supplied to a multi-segment area delay circuit 37. The delay circuit 37 is connected to the system controller circuit 9, and the output signal from the delay circuit 37 is supplied to a multi-segment side fixed terminal m of the switch 22.

Figure 3:
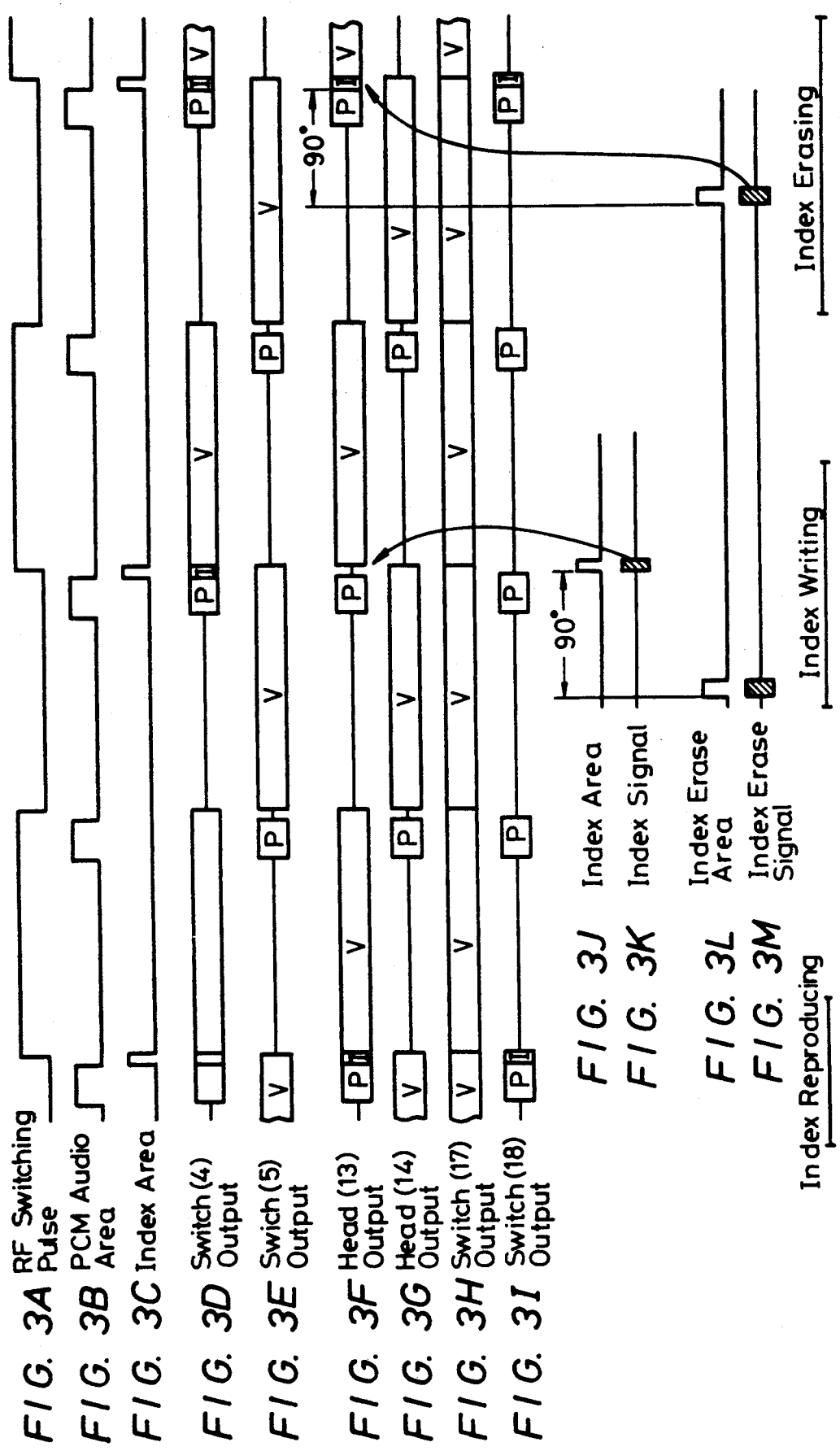
FIGS. 3(A-M), 4 and 5(A-D) are diagrams useful for explaining the present invention.

Referring to FIG. 3, the timing chart thereof will now be described. When an RF switching pulse shown in FIG. 3A is generated, the PCM-audio area signal and the index area signal become as shown in FIGS. 3B and 3C. Accordingly, on the basis of these signals, from the switches 4 and 5 there are derived signals shown in FIGS. 3D and 3E. These signals are recorded by the heads 13 and 14.

Upon playback, from the rotary heads 13 and 14 there are reproduced signals shown in FIGS. 3F and 3G. Hence, a video signal shown in FIG. 3H is derived from the switch 17, and the PCM-audio signal and the index signal are derived from the switch 18.

When the index signal is written, the apparatus is placed in the recording mode only during an index area shown in FIG. 3J; and during this period, an index signal shown in FIG. 3K is formed. Furthermore, preceding the index signal recording in the index area, an index erase area is formed at the position preceded by an attaching angle (for example, 90°) of the flying erase head as shown in FIG. 3L. During this period, an erase signal shown in FIG. 3L is generated. If the index area is selected, for example in FIG. 3M, to be 2.06° (3H), the index erase area has a period longer than the same by 1H each to the head and to the tail.

When the index signal is only to be erased without recording a new index signal, only the index erase signal is formed as shown at the right-hand side of FIGS. 3L and 3M.

As described above, the index signal area is formed at a predetermined position of the recording track and the index signal can be recorded, reproduced, written and erased in and from this area.

Figure 4:
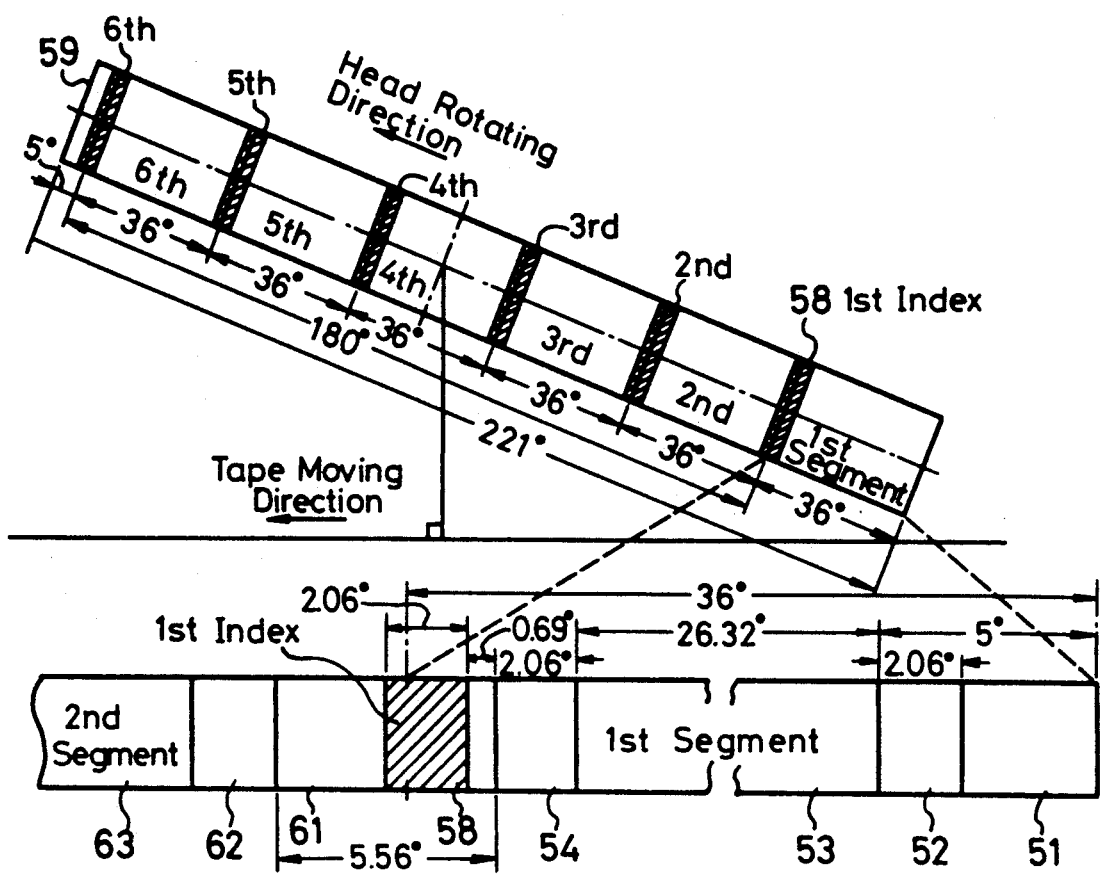

A multi-segment operation will now be described. In the above mentioned circuit, by delaying the RF switching pulse by 36° or by multiple of 36° in the delay circuit 37, as shown in FIG. 4, it is possible to independently record and/or reproduce the PCM audio signal in and from respective segments that are provided by equally dividing the video signal portion by 5.

Also in that case, by using the above mentioned circuit, the index area can be provided at the position across the rear back margin and guard area of each segment and the run-in area of the succeeding segment, in which the index signal can be provided independently.

A practical example of an index signal will now be described. The frequency of the index signal is selected to be a frequency having a small azimuth loss that can be detected by both the heads 13 and 14 as a low frequency, and to be a frequency having a small interference with the other pilot signal (the 8 mm video tape recorder uses a pilot signal with frequency ranging from 100 to 200 kHz for tracking purposes). By example, in the 8 mm video tape recorder, the frequency of the index signal is selected to be 386 kHz, that is 1/30 of the master clock. The index signal is recorded continuously for a period of several fields.

Figure 5A:
Figure 5B:
Figure 5C:
Figure 5D:

When there is a crosstalk of the index signal from the adjacent track and there are crosstalks as shown in FIGS. 5A and 5C relative to an index output signal shown in FIG. 5B, the envelope is disturbed due to zero beat as, for example shown in FIG. 5D. Therefore, according to the above mentioned circuit, by recording the index signal only bh the head 13 (see FIGS. 3D and 3E), it is possible to prevent the crosstalk from occurring and thus to remove a fear that the mis-operation due to the disorder of the envelope which may occur.

Furthermore, for reproducing and detecting the index signal, the synchronous detection is suitably utilized. In that case, the frequency deviation caused upon the fast forward mode and the rewind mode can be corrected by changing a self-running frequency of a PLL circuit of the synchronous detector.

The index signal may be a signal with a constant frequency and may be an encoded signal after a certain modulation.

According to the present invention, since the index signal is recorded and/or reproduced by the rotary head, a special fixed head or the like is not required. Particularly when there is provided a multi-segment, the index signal is provided in each segment so that these index signals can be recorded, reproduced, and erased independently by the simple circuit arrangement. Therefore, it becomes possible to find out the beginning of the recording portion, etc. satisfactorily.

Although various minor changes and modifications might be proposed by those skilled in the art, it will be understood that we wish to include within the claims of the patent warranted hereon all such changes and modifications as reasonably come within our contribution to the art.

We claim as our invention:

1. An apparatus for recording and reproducing at least a digitized audio signal on a magnetic tape having a slant track format, comprising:
    a cylindrical surface having a rotary head associated therewith, and a slant track format magnetic tape wrapped around the cylindrical surface so as to be in position for scanning by the rotary head;
    said rotary head having a transducer means for recording on and reproducing from slant tracks on the magnetic tape;
    pilot signal tracking means connected to said rotary head transducer means for producing a four frequency signal which is recorded by the rotary head;
    audio signal processing means connected to said transducer means for recording and reproducing at least one digitized audio signal on a part of a plurality of slant tracks;
    index signal means also connected to said transducer means for supplying an index signal to said transducer means to be recorded anywhere within a rear back area and guard area associated with and directly following the part of each of a predetermined number of said plurality of slant tracks identifying a beginning of a desired program of the digitized audio signal;
    said index signal means producing said index signal such that it has a predetermined frequency chosen for searching said beginning of said desired program and so as not to interfere with the four frequency pilot signal; and
    means connected to said audio signal processing means for detecting said index signal so as to identify said beginning of the desired program of said digitized audio signal on the slant track during reproducing.

2. An apparatus according to claim 1 wherein said audio signal processing means includes means for recording six separate PCM audio channels at six substantially equal 36° PCM audio parts along a 221° expanse of each slant track.

3. An apparatus according to claim 1 wherein the rotary head is adapted for a magnetic tape that is 8 mm wide.

4. An apparatus for recording and reproducing at least a digitized audio signal on a magnetic tape having a slant track format, comprising:
- a cylindrical surface having a rotary head associated therewith, and a slant track format magnetic tape wrapped around the cylindrical surface so as to be in position for scanning by the rotary head;
- said rotary head having a transducer means for recording on and reproducing from slant tracks on the magnetic tape;
- pilot signal tracking means connected to said rotary head transducer means for producing a four frequency pilot signal which is recorded by the rotary head;
- audio signal processing means connected to said transducer means for recording and reproducing at least one digitized audio signal on a part of a plurality of slant tracks;
- index signal means also connected to said transducer means for supplying an index signal to said transducer means to be recorded at a rear back area associated with and directly following the part of each of a predetermined number of said plurality of slant tracks identifying a beginning of a desired program of the digitized audio signal;
- said index signal means producing said index signal such that it has a predetermined frequency chosen for searching said beginning of said desired program and so as not to interfere with the four frequency pilot signal;
- means connected to said audio signal processing means for detecting said index signal so as to identify said beginning of the desired program of said digitized audio signal on the slant track during reproducing; and
- the index signal being recorded across both a rear back margin area and guard area of each audio part and a run-in area of a succeeding audio part.

5. An 8 mm tape apparatus for recording and reproducing at least a digitized audio signal on a magnetic tape which is 8 mm wide and having a slant track format, comprising:
- a cylindrical surface having a rotary head associated therewith, and a slant track format magnetic tape wrapped around the cylindrical surface so as to be in position for scanning by the rotary head;
- said rotary head having a transducer means for recording on and reproducing from slant tracks on the magnetic tape;
- pilot signal tracking means connected to said rotary head transducer means for producing a four frequency pilot signal which is recorded by the rotary heads;
- audio signal processing means connected to said transducer means for recording and reproducing at least one digitized audio signal on a part of a plurality of slant tracks;
- index signal means also connected to said transducer means for supplying an index signal to said transducer means to be recorded anywhere within a rear back area and guard area associated with and directly following the part of each of a predetermined number of said plurality of slant tracks identifying a beginning of a desired program of the digitized audio signal;
- said index signal means producing said index signal such that it has a predetermined frequency chosen for searching said beginning of said desired program and so as to not interfere with the four frequency pilot signal; and
- means connected to said audio signal processing means for detecting said index signal so as to identify said beginning of the desired program of said digitized audio signal on the slant track during reproducing.

* * * * *